(12) United States Patent
Eriksson et al.

(10) Patent No.: US 9,096,215 B2
(45) Date of Patent: Aug. 4, 2015

(54) METHOD TO CONTROL A DRIVETRAIN OF A VEHICLE

(75) Inventors: Anders Eriksson, Torslanda (SE); Marcus Steen, Angered (SE)

(73) Assignee: Volvo Lastvagnar AB, Göteborg (SE)

( * ) Notice: Subject to any disclaimer, the term of this patent is extended or adjusted under 35 U.S.C. 154(b) by 165 days.

(21) Appl. No.: 13/994,375

(22) PCT Filed: Dec. 17, 2010

(86) PCT No.: PCT/EP2010/007730
§ 371 (c)(1),
(2), (4) Date: Aug. 16, 2013

(87) PCT Pub. No.: WO2012/079608
PCT Pub. Date: Jun. 21, 2012

(65) Prior Publication Data
US 2014/0149006 A1    May 29, 2014

(51) Int. Cl.
*B60W 10/06* (2006.01)
*B60W 10/10* (2012.01)
*F01P 7/16* (2006.01)
*B60W 50/00* (2006.01)

(52) U.S. Cl.
CPC ............... *B60W 10/10* (2013.01); *B60W 10/06* (2013.01); *B60W 50/0097* (2013.01); *F01P 7/165* (2013.01); *F01P 7/167* (2013.01); *B60W 2550/143* (2013.01); *B60W 2550/402* (2013.01); *B60W 2710/0605* (2013.01); *B60W 2710/0688* (2013.01); *B60W 2710/1005* (2013.01); *F01P 2025/62* (2013.01); *F01P 2025/66* (2013.01); *Y02T 10/84* (2013.01)

(58) Field of Classification Search
CPC ................ B60W 10/04; B60W 10/06; B60W 10/10–10/115; F01P 7/00
See application file for complete search history.

(56) References Cited

U.S. PATENT DOCUMENTS

| 5,359,969 | A | 11/1994 | Dickrell et al. |
| 6,044,809 | A | 4/2000 | Till et al. |
| 6,045,482 | A | 4/2000 | Nishar et al. |
| 6,591,811 | B2 | 7/2003 | Kaltenbrunn et al. |
| 7,424,868 | B2 | 9/2008 | Reckels et al. |
| 2007/0261648 | A1 | 11/2007 | Reckels et al. |
| 2012/0167555 | A1* | 7/2012 | Frazier .......................... 701/102 |

FOREIGN PATENT DOCUMENTS

| DE | 102005017127 A1 | 11/2006 |
| EP | 0974742 A2 | 1/2000 |
| EP | 1316696 A2 | 6/2003 |
| EP | 1876080 A2 | 1/2008 |
| JP | 2003328756 A2 | 11/2003 |
| JP | 2004162542 A2 | 6/2004 |
| WO | 03041987 A1 | 5/2003 |

OTHER PUBLICATIONS

International Search Report (Nov. 18, 2011) for corresponding International application No. PCT/EP2010/007730.
International Preliminary Report on Patentability (Dec. 13, 2012) for corresponding International application No. PCT/EP2010/007730.

* cited by examiner

*Primary Examiner* — Jacob S Scott
(74) *Attorney, Agent, or Firm* — WRB-IP LLP

(57) ABSTRACT

A method is provided to control a drivetrain of a vehicle, especially a utility vehicle, wherein the drivetrain includes an engine with a cooling system. The cooling system includes a fan. The cooling system and the drivetrain are controlled by an electronic control unit (ECU). The ECU has access to a navigation system with topographic data. The method includes determining a topology of an upcoming route of the vehicle, estimating the load of the engine dependent of the topology of the upcoming route, estimating a temperature variation of the cooling system during the upcoming route, and controlling the drivetrain dependent on the estimated temperature variation, such that an actual temperature of the cooling system is kept below a temperature threshold value during the upcoming route of the vehicle. The temperature threshold value is dependent on a temperature at which said fan is activated.

9 Claims, No Drawings

METHOD TO CONTROL A DRIVETRAIN OF A VEHICLE

BACKGROUND AND SUMMARY

The present invention relates, according to an aspect thereof, to a method for controlling the engine temperature of a vehicle, especially a utility vehicle, such as a heavy duty vehicle or similar.

In order to obtain efficient working conditions in a vehicle engine the engine is provided with a cooling system. Normally the engine uses heat exchanger with a coolant liquid and an engine fan. The temperature of the cooling system is depended on the workload of the engine, wherein to avoid too high temperatures of the cooling fluid, the engine fan forces an airflow over the heat exchanger. Today the activation and control of the engine fan is controlled by a thermostat.

Especially in heavy utility vehicles the engine fan is a major power consumer, and thereby has a significant influence on the fuel efficiency of the vehicle. There are methods aiming to avoid a start of the engine fan. Said methods uses the auxiliary systems of the vehicle to draw heat from the engine during short periods, wherein an activation of an engine fan is delayed or avoided. However, these methods have the drawback that the purpose of said auxiliary systems is not always needed or wanted, such as heating of the driver's cabin.

The present invention aims, according to an aspect thereof, to solve the above mentioned problem and thereby suggest a method for controlling a drivetrain in a more efficient way.

The present invention rests, according to an aspect thereof, upon the finding, that an activation of an engine fan can be avoided, if the drivetrain of the vehicle is controlled in such a manner that the temperature of the engine and the cooling system is kept below a predetermined threshold value, which is dependent of an activation temperature of the engine fan.

Hence, the present invention, according to an aspect thereof, provides a method to control a drivetrain of a vehicle, especially a utility vehicle. The method is adapted for a drivetrain comprising an engine with a cooling system, said cooling system comprises an engine fan, wherein the cooling system and the drivetrain is controlled by an electronic control unit (ECU), and wherein said ECU having access to topographic data of an upcoming route, wherein said method comprises the steps of;
  determining a topology of an upcoming route of the vehicle,
  estimating the load of the engine dependent of the topology of the upcoming route,
  estimating a temperature variation of the cooling system during the upcoming route, and
  controlling the drivetrain dependent on the estimated temperature variation, such that an actual temperature of the cooling system is kept below a temperature threshold value during the upcoming route of the vehicle, and
wherein said temperature threshold value is dependent on a temperature at which said fan is activated.

The advantage with this method is that it reduces the number of times the cooling fan has to be activated to provide additional cooling and thereby reduce the energy needed to cool the engine. Hence when a topology of an upcoming route is determined, an estimation of the load of the engine during the upcoming route can be performed through an algorithm, considering the influencing factors, such as said topology of the upcoming route and the specification of the drivetrain. The ECU can get the information about the topology of the upcoming route from any available source, i.e. a navigation system, a digital map or a database with route information. The temperature variation can thereby also be estimated and peak temperatures where the engine fan is activated can be found. An amended drivetrain control strategy is thereby implemented, which keeps the engine and cooling system temperature below a temperature threshold value, at which the engine fan is activated. Fuel is saved because an activation of the high power consumer engine fan can be avoided through the use of the inventive method. A total avoidance of activation of the engine fan can probably not be reached for all routes. However, the inventive method can be implemented as far as possible. It is possible to complete the method with limit values for acceleration, vehicle speed, etc. which must not be exceeded and/or under passed, wherein the inventive method is implemented until the extent that one of the limit values is reached.

The method is especially effective for utility vehicles, which usually have high power engines and thereby also have a bigger engine fan, to provide a sufficient airflow over the heat exchanger.

DETAILED DESCRIPTION

The method according to an aspect of the invention is adapted for a vehicle comprising a drivetrain with an engine having a cooling system and an engine fan. The cooling system and the drivetrain are controlled by an electronic control unit (ECU) wherein the ECU has access to a navigation system with topographic data. ECUs controlling the cooling system and the drivetrain are well known in the art.

The navigation system may be any kind of satellite-based navigation system available for the operator of the vehicle or as a black box system just used by the vehicle's ECU. Even though satellite-based navigation systems are the most common navigation systems, any other kind of navigation system based on other techniques are also possible to use in the inventive method.

The inventive method is based on the idea to control the drivetrain dependent of a threshold value for activation of the engine fan, whereby the aim is to keep the temperature of the engine and/or the cooling system such that an activation of the engine fan is avoided. This will reduce the fuel consumption of the vehicle.

The first step of the inventive method comprises the determination of a topology of an upcoming route of the vehicle by use of an onboard navigation system. The navigation system can access route information from a map database comprising commercial maps or a database comprising recorded road information from previous drives along the route. Other sources of information comprising topology information (i.e. changes in elevation) about an upcoming route are just as suitable.

Based on the topology of the upcoming route, the load of the engine is estimated. Based on the estimated load of the engine an estimation of the temperature variation of the cooling system during the upcoming route is derived. Because all the parameters of the drivetrain are known, such estimations are easily made and are well known. Further, the method is adapted to use all available data that influence the load of the engine and is accessible for the ECU, for example, the vehicle speed, vehicle acceleration and also vehicle mass, where available.

The load and temperature estimations are preferably made in portions, wherein the length of the portions is dependent of the topology of the upcoming route. The portions is preferably sections of the upcoming route including relevant inclinations such as one or more hills, wherein it is beneficial to end a portion after a downhill slope, when the estimated temperature of the engine and the cooling system is a predefined value below a first threshold value.

If, the estimated temperature variation of the cooling system at any point reaches a temperature above a first threshold value, an alternative drivetrain control is calculated, which keeps the temperature of the cooling system below said first temperature threshold value. This alternative drivetrain control is then implemented.

Hence, the drivetrain is controlled dependent on the estimated temperature variation, such that an actual temperature of the cooling system is kept below a first temperature threshold value during the upcoming route of the vehicle.

How this is implemented is obviously dependent of the upcoming topology. However, this may be achieved by increasing the velocity of the vehicle on a stretch of flat or downhill route prior to an uphill slope. Using the increased kinetic energy of the vehicle, the vehicle is able to climb said uphill slope with a lower engine load and thereby without having to increase the temperature of the engine above the first temperature threshold value.

The first temperature threshold value is dependent on a temperature of the cooling system and the engine at which said fan is activated. However, by keeping the temperature of the cooling system below this first temperature threshold value, the vehicle is able to climb the slope without activating the engine fan to keep the temperature of the cooling system below said threshold value. Because the engine fan is a relative large energy consumer, fuel is saved due to the changed drivetrain control.

In a further embodiment of the method the drivetrain is controlled, such that an actual temperature gradient of the cooling system is kept below a temperature gradient threshold value during the upcoming route of the vehicle. Instead of just looking at the temperature during a specific moment in time the gradient of the temperature gradient is monitored in order to prevent too high temperature rises after the first temperature threshold value has been exceeded. If the temperature gradient is determined to be too steep the vehicle may have to reduce the load of the engine during some parts of the upcoming route, hence amend the control strategy of the drivetrain.

The temperature threshold value may be adjusted to a crest temperature threshold value, which is greater than said predetermined temperature threshold value, if the topology of the upcoming route is such, that the vehicle is approaching a crest of a hill, which subsequent downhill slope is sufficient too cool the cooling system below the predetermined temperature threshold value. This is done to allow for a slightly elevated temperature of the engine during brief moments when the vehicle is passing the crest of a hill. By allowing the actual temperature of the cooling system to temporarily exceed the temperature threshold, the ECU can actively avoid an activation of the fan and energy is saved. The higher crest temperature threshold value is allowed, because an effective cooling of the engine is enabled in the upcoming downhill slope, as the load of the engine is reduced and the speed of the vehicle still is increased due to the downhill slope, whereby the air flow cooling the engine and the cooling system and the flow rate of the cooling fluid in the cooling system is correspondently maintained or increased.

In the method the estimation of the temperature variation of the cooling system, may further be dependent on the actual weather and wind conditions in a surrounding of the vehicle. By using the actual temperature in the surrounding of the vehicle in the prediction of the temperature variation of the cooling system will result in more reliable prediction, wherein the inventive method will be more accurate.

The method may also be adapted to be used together with a cruise control. By implementing the inventive method during the use of a cruise control, the method can be performed automatically. Also a set speed of the cruise control can be limited or lowered in order to limit the load on the engine and thereby the heat release. When using the method and a cruise control is not activated, the ECU cannot control the drivetrain to the same extent as if the cruise control is activated, however it would be possible to limit the torque output of the engine, the use of one or several gears in the transmission and forced down or up shifting of the transmission.

To keep the temperature of the engine and the cooling system below said temperature threshold value a torque limitation of the engine can be set, wherein the torque of the engine is limited. Further the fuel throttle of the engine can be controlled such that the actual temperature of the cooling system is kept below said temperature threshold value. A further measurement to achieve the aim of the method is to adapt a shift strategy of a transmission such that the actual temperature of the engine and the cooling system is kept below said temperature threshold value. All those measurements (engine torque limitation, amended fuel throttle control and shift strategy adaptation) can be used individually or combined with each other.

For example, when the actual temperature of the cooling system is close to the predetermined temperature threshold value, a downshift may be initiated. A downshift results in a higher speed of the engine and thereby a higher flow of the cooling fluid in the cooling system. Optionally, said down shift may only be initiated if the topology of the upcoming route indicates that the vehicle is or is soon to be in a downhill slope. A downshift during a travel in a downhill slope results in a higher speed of the engine compared to a travel with a higher vehicle speed. The higher speed of the engine results in a higher flow rate of the cooling fluid in the cooling system, whereby the cooling of the engine becomes more efficient. During driving in a downhill slope it may further be advantageous to activate the engine fan, even though said first threshold value has not been reached, this to decrease the temperature of the engine further below the first temperature threshold value.

Alternatively the method further comprises the step of controlling the engine such, that the speed of the vehicle is increased, during an approach of an uphill slope. By increasing the speed of the vehicle before reaching the uphill slope, the kinetic energy of the vehicle is increased, wherein the load of the engine during the climb of the uphill slope can be reduced, resulting in a decreased cooling need of the engine through the cooling system.

The invention claimed is:

1. A method to control a drivetrain of a vehicle, especially a utility vehicle, wherein the drivetrain comprises an engine with a cooling system, the cooling system comprising an engine fan, wherein the cooling system and the drivetrain is controlled by an electronic control unit (ECU), and wherein the ECU having access to topographic data of an upcoming route, comprising determining, a topology of an upcoming route of the vehicle, estimating the load of the engine dependent of the topology of the upcoming route, estimating a temperature variation of the cooling system during the upcoming route, and controlling the drivetrain dependent on the estimated temperature variation, such that an actual temperature of the cooling system is kept below a first temperature threshold value during the upcoming route of the vehicle, and wherein the first temperature threshold value is dependent on a temperature at which the engine fan is activated, wherein the method further comprises at least one of the steps of controlling a fuel throttle of the engine, such that the actual temperature of the cooling system is kept below the temperature threshold value, limiting the output torque of the engine, and controlling a shift strategy of a transmission, such that the actual temperature of the cooling system is kept below the temperature threshold value.

2. The method according to claim 1, wherein the method further comprises controlling the drivetrain, such that an actual temperature gradient of the cooling system is kept below a temperature gradient threshold value during the upcoming route of the vehicle.

3. The method according to claim 2, wherein the temperature threshold value is adjusted to a crest temperature threshold value, which is greater than the predetermined temperature threshold value, if the topology of the upcoming route is such, that the vehicle is approaching a crest of a hill, which subsequent downhill slope is sufficient to cool the cooling system below the predetermined temperature threshold value.

4. The method according to claim 1, wherein the estimation of the temperature variation of the cooling system, further is dependent on the actual weather and wind conditions in a surrounding of the vehicle.

5. The method according to claim 1, wherein the method is adapted to be used together with a cruise control.

6. The method according to claim 5, wherein the method further comprises limiting or decreasing a set speed of the cruise control.

7. The method according to claim 1, wherein when the actual temperature of the cooling system is close to the predetermined temperature threshold value, the method further comprising initiating a down shift.

8. The method according to claim 7, wherein the down shift is only initiated if the topology of the upcoming route indicates that the vehicle is in a downhill slope.

9. The method according to claim 1, wherein the method further comprises controlling the engine such, that the speed of the vehicle is increased, during an approach of an uphill slope, and the speed is used to allow an engine load to become in total lower during a climb of the uphill slope.

* * * * *